March 26, 1940.　　　J. S. IRVING　　　2,195,030
CLUTCH AND GEAR OPERATING MECHANISM FOR MOTOR VEHICLES
Filed May 4, 1937　　　2 Sheets-Sheet 1
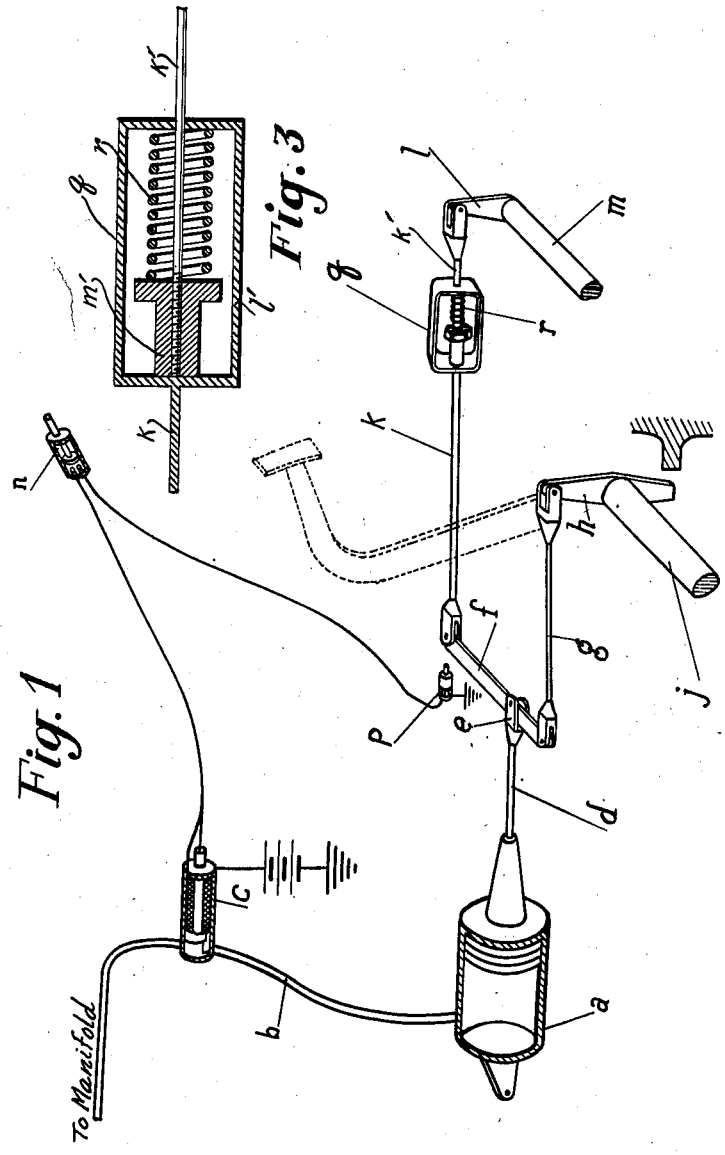
Inventor
John Samuel Irving
By H. O. Clayton
Attorney

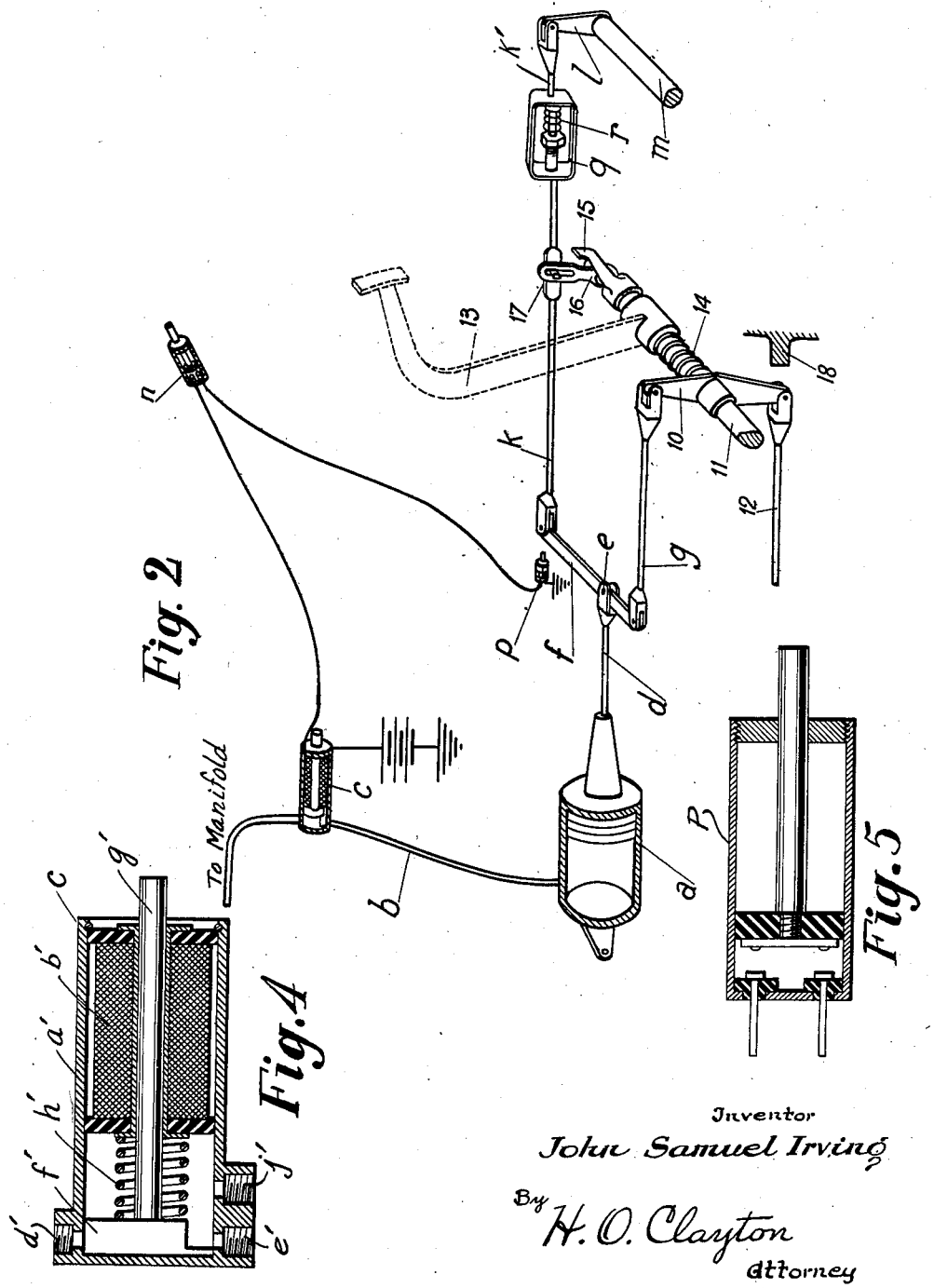

Patented Mar. 26, 1940

2,195,030

UNITED STATES PATENT OFFICE 2,195,030

CLUTCH AND GEAR OPERATING MECHANISM FOR MOTOR VEHICLES

John Samuel Irving, Birmingham, England, assignor to Bendix Aviation Corporation, South Bend, Ind., a company Application May 4, 1937, Serial No. 140,719
In Great Britain May 15, 1936

3 Claims. (Cl. 192—3.5)

This invention relates to improvements in clutch and gear operating mechanism for motor vehicles employing a mechanical clutch between the engine and an epicyclic gear box of the preselective or "self-changing" type.

The object of my invention is to provide mechanism for automatically operating the clutch and gear-change whereby the driver is relieved of any physical effort and which insures that the clutch is always fully disengaged before a gear is changed and that the gear change is completed before the clutch is re-engaged.

According to my invention the clutch and the gear-change are operated by a pressure differential operated motor which is controlled manually or electrically and is coupled to the clutch and the gear-changing mechanism through a balance bar in such a manner that the effort of the motor is applied first to the clutch lever and no movement of the gear-changing mechanism takes place until the clutch lever has moved to the limit of its travel. After the gear change has been completed the motor is preferably deenergised automatically and the clutch then re-engages.

If desired the mechanism may be so arranged that in the event of a failure of the motor for any reason the gear-changing mechanism can be operated manually by the normal clutch pedal.

Two convenient practical arrangements in accordance with my invention have been illustrated diagrammatically by way of example in the accompanying drawings in which:

Figure 1 shows a layout for power operation only.

Figure 2 shows a similar layout with provision for manual operation in the event of failure of the power operating means.

Figure 3 is an enlarged sectional view of the yieldable connection between the transmission and the balance-bar.

Figure 4 is a view, in section, disclosing the details of the control valve.

Figure 5 is a sectional view disclosing the details of the release switch.

In the layout shown in Figure 1 $a$ is a pressure differential operated motor mounted on a fixed part of the vehicle and connected to the induction manifold of the engine by way of a pipe $b$ and a control valve $c$. This valve includes a casing $a'$ ported at $d'$ and $e'$ to receive those portions of the pipe $b$ connected with the intake manifold and motor $a$ respectively. The casing houses a reciprocable plunger $f'$ having a stem $g'$, constituting the armature of a solenoid $b'$ for operating the valve. The piston-rod $d$ of the motor is pivotally connected at $e$ to a floating balance-bar $f$ of which one end is connected by a link $g$ to an arm $h$ on the clutch-operating shaft $j$ while the other end is connected by a linkage $k$, $k'$ and a yieldable connection to be described hereinafter to an arm $l$ on the gear-operating shaft $m$ in the gear-box.

The connection $e$ of the piston-rod to the bar is not central but is arranged adjacent to the end of the bar connected by the link $g$ to the clutch-operating shaft.

The solenoid $b'$ of the control valve $c$ may be controlled to operate the valve by a manually operated press-button switch $n$ and a release switch $p$ arranged adjacent to the end of the balance-bar which is connected to the gear-operating shaft. As disclosed in Figures 1 and 2, the solenoid $b'$ and switches $n$ and $p$ are wired in series.

When it is desired to engage a gear or to change gear the gear-selector is operated in the usual way to select the gear and the switch $n$ is depressed. The solenoid $b'$ is thus energized to move the valve plunger $f'$ to the right against the tension of a spring $h'$. This spring serves to bias the plunger $f'$ to the left to thereby interconnect the port $e'$ with a port $j'$ in the valve casing and vent the motor $a$ to the atmosphere. When the plunger $f'$ is moved to the right, the fluid transmitting connection between the intake manifold and the motor is completed and, assuming the throttle to be closed to make of the manifold a source of vacuum, the motor is thus energized by partially evacuating the same. The consequent pull to the balance-bar is first applied through the link $g$ to the clutch-operating shaft, the balance-bar rocking about the end connected to the gear-operating shaft. When the clutch-operating shaft has reached the end of its travel on full disengagement of the clutch the balance-bar then rocks about the end connected to that shaft and the further effort exerted by the motor is applied through the linkage $k$, $k'$ to the gear-operating shaft to effect a change of gear.

After the operation of the transmission has been completed and as the balance-bar reaches the end of its travel, the latter opens the release switch $p$, thereby deenergizing the solenoid $b'$. The valve spring $h'$ then functions to move the plunger $f'$ to the left to vent the motor to the atmosphere. The consequent deenergization of the motor results in the clutch returning to its engaged position under the action of its springs. A delay action, such, e. g., as that disclosed in Price et al. Patent No. 2,118,226, dated May 24, 1938, may be introduced to come into operation at the plate engaging position of the clutch to insure a smooth engagement of the clutch.

With some types of epicyclic gear-box the gear-operating shaft moves through different angles for engaging different gears, and to allow for this a sliding connection $q$ incorporating a preloaded spring $r$ may be arranged in the linkage $k, k'$ between the balance-bar and the gear-operating shaft. As disclosed in Figure 3, this sliding connection includes a rectangular-shaped band member $l'$ permanently secured to the link $k$. The link $k'$, secured to the transmission operating arm $l$, slidably passes through the member $l'$ and has threadedly secured at its end a nut $m'$. The aforementioned spring $r$ is interposed between the end of the nut $m'$ and the band $l'$. After the operation of the transmission has been completed, if at that time the bar $f$ has not moved sufficiently far to contact and open the breaker switch $p$, then the spring $r$ will be compressed to permit the link $k$ and bar $f$ to continue their movement and thereby effect an operation of the switch $p$. This mechanism insures that the end of the balance-bar connected to the gear-operating shaft will always move through a predetermined distance sufficient to operate the release switch irrespective of the angle through which the gear-operating shaft is moved to engage a gear.

In the modified layout shown in Figure 2 the arrangement of the pressure differential operated motor $a$, balance-bar $f$, link $g$ and linkage $k, k'$ is the same, and the same reference letters are used for these parts. The link $g$, however, instead of being connected to an arm on the clutch-operating shaft is connected to the upper end of a double-armed lever 10 which is freely rotatable on a shaft 11, and the lower end of the lever is connected by a link 12 to an arm on the clutch-operating shaft. The clutch pedal 13 is keyed on the shaft 11 and the lever 10 is coupled to the clutch pedal boss by a preloaded torsion spring 14 fitting around the shaft. The strength of the spring 14 is just sufficient to disengage the clutch and it is preferably of a very low rate to reduce the load on the clutch pedal. Also keyed on the shaft 11 is an arm carrying a laterally projecting lug 15 which is normally spaced angularly from an arm 16 which is freely rotatable on the shaft and is slotted to receive a transverse pin 17 on the link $k$ leading to the gear-operating mechanism.

Normally the clutch and gear-changing mechanism are operated by the motor as described above but in the event of a failure of the motor for any reason the clutch pedal is depressed and, acting through the spring 14, the lever 10, and the link 12, disengages the clutch. When the clutch is fully disengaged the lower end of the lever 10 abuts against a fixed stop 18 so that no further movement of the lever 10 can take place, but on continued movement of the clutch pedal the lug 15 engages and rocks over the arm 16 which actuates the gear-changing mechanism through the pin 17 and the link $k$. Sufficient clearance is normally left between the lug 15 and the arm 16 to insure that the lug does not engage the arm until the lever 10 has engaged the stop 18 so that the clutch is fully disengaged before a gear is changed.

Whilst one embodiment of the invention has been disclosed, it is to be understood that the scope of the invention is not to be limited thereto, but only by the appended claims.

I claim:

1. In a device of the class disclosed, a clutch operating member, a gear shifting member, a fluid actuated motor, a floating balance bar through which the members are actuated by the motor and means controlled by the position of the balance bar for effecting de-energization of the motor.

2. In a mechanism of the class described, a clutch operating member, a gear shifting member, power means for operating said members, and means, including a floating balance-bar, interconnecting said members and power means, said interconnecting means being so constructed and arranged as to effect a sequential operation of the clutch and gear shifting members.

3. In a clutch and gear shifting mechanism for an automotive vehicle, a clutch operating member, a transmission operating member, a fluid actuated motor, valve means for controlling the operation of said motor, and means interconnecting the power element of said motor with the aforementioned members, said means including a lever member and connections interconnecting said lever member with the clutch and transmission operating members, said parts being so constructed and arranged that the fulcrum of the lever shifts during the operation of the clutch and transmission to effect a sequential operation thereof.

JOHN SAMUEL IRVING.